United States Patent [19]

Boyle et al.

[11] Patent Number: 6,092,229
[45] Date of Patent: *Jul. 18, 2000

[54] SINGLE CHIP SYSTEMS USING GENERAL PURPOSE PROCESSORS

[75] Inventors: Douglas B. Boyle, Palo Alto; Michael D. Rostoker, Boulder Creek, both of Calif.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,475

[22] Filed: Oct. 9, 1996

[51] Int. Cl.$^7$ ..................................................... G06F 11/00
[52] U.S. Cl. .............................................. 714/748; 714/6
[58] Field of Search .................... 395/185.05, 185.01, 395/185.06, 182.16; 371/32, 33, 34, 53, 67.1, 68.2; 714/52, 48, 53, 18, 6, 748, 749, 750

[56] References Cited

U.S. PATENT DOCUMENTS

| | | | |
|---|---|---|---|
| 4,402,043 | 8/1983 | Guttag et al. | |
| 4,779,274 | 10/1988 | Takahashi et al. | 371/32 |
| 4,819,237 | 4/1989 | Hamilton et al. | 714/22 |
| 4,933,772 | 6/1990 | Ikenoue et al. | 358/300 |
| 4,991,169 | 2/1991 | Davis et al. | |
| 5,311,451 | 5/1994 | Barrett | 364/528.13 |
| 5,347,643 | 9/1994 | Kondo et al. | 395/425 |
| 5,404,361 | 4/1995 | Casorso et al. | 371/40.1 |
| 5,410,546 | 4/1995 | Boyer et al. | 371/371.1 |
| 5,493,524 | 2/1996 | Guttag et al. | |
| 5,553,301 | 9/1996 | New et al. | 395/825 |
| 5,604,865 | 2/1997 | Lentz et al. | 395/200.08 |
| 5,617,537 | 4/1997 | Yamada et al. | 395/200.01 |
| 5,621,883 | 4/1997 | Thoulon et al. | 395/183.07 |
| 5,649,187 | 7/1997 | Hornbuckle | 395/610 |
| 5,696,936 | 12/1997 | Church et al. | 395/465 |
| 5,754,863 | 5/1998 | Reuter | 395/712 |

OTHER PUBLICATIONS

Ralston, Anthony et al., "Encyclopedia of Computer Science", 3rd Ed., International Thomson Computer Press, 1995 pp. 874–882.

*Primary Examiner*—Ly V. Hua

[57] ABSTRACT

A system for providing information to memory within a local device is provided herein. The system initially receives information transmitted from a remote location and reads predetermined data, including start and end addresses, within the local device. The system computes a checksum based on information received from the remote location and the predetermined data and compares a predetermined checksum to the received information checksum. If the predetermined checksum does not equal the received information checksum, the system requests retransmission of information and repeats the preceding steps (receiving information, computing a checksum, and comparing) until the predetermined checksum equals the received information checksum. The system then provides the valid information to local device memory. The invention may execute a protocol to receive information packets and store the information packets in appropriate memory locations after receiving the information. The system may copy information from the remote location directly into local device memory. The system is implemented on a single chip and provides information to memory of a local device. The system utilizes minimal non-volatile memory and comprises a microprocessor and registers including a start register, an end register, and a checksum register, and a communications interface. The communications interface receives information from a remote device, the microprocessor receives information from the communications interface and evaluates whether information received is valid, and the microprocessor passes valid information to RAM for execution.

28 Claims, 2 Drawing Sheets

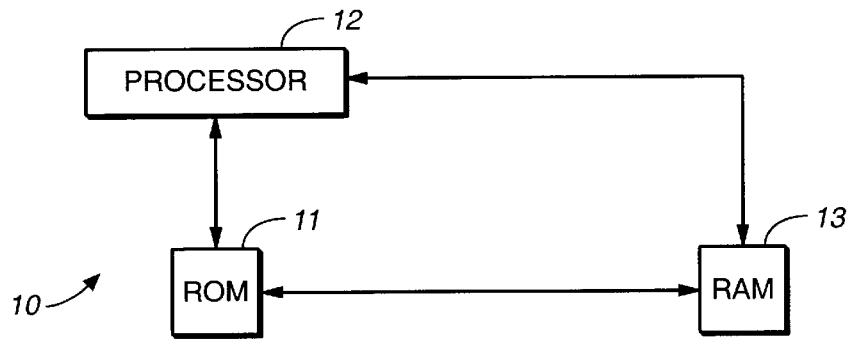
FIG._1
*(PRIOR ART)*
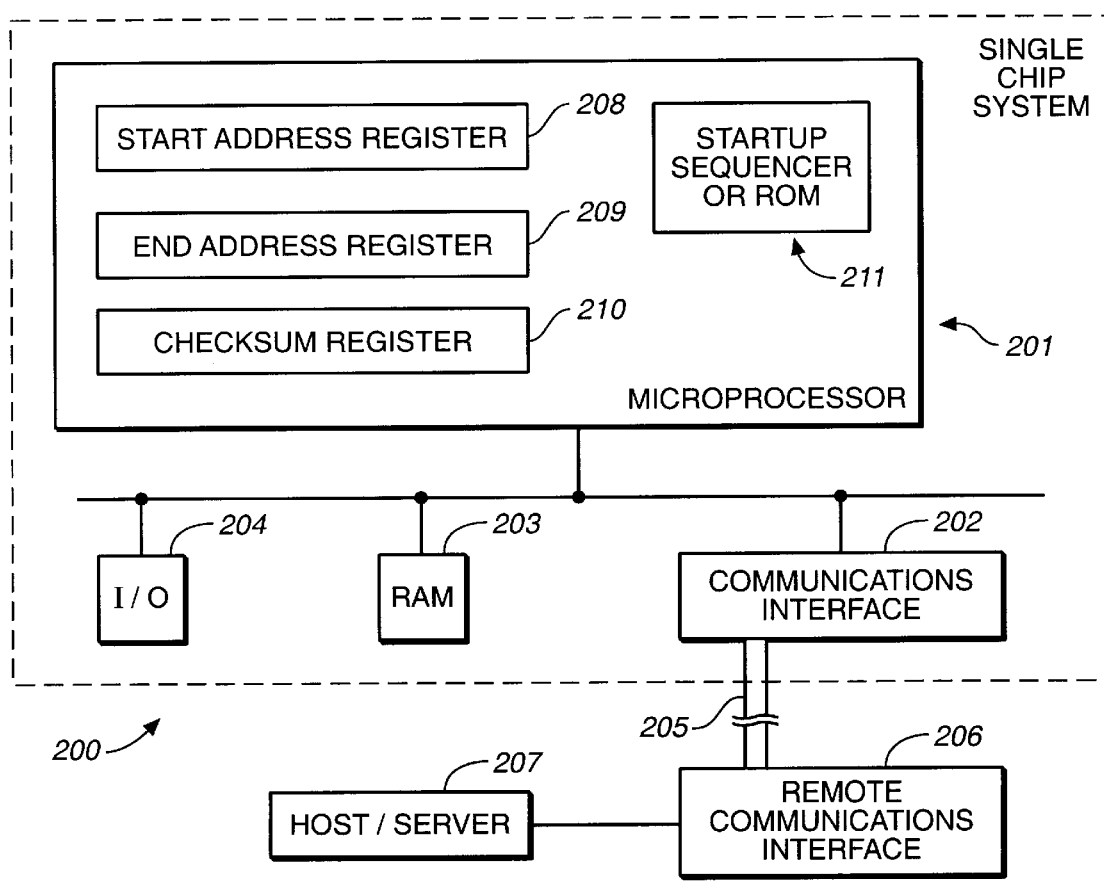
FIG._2

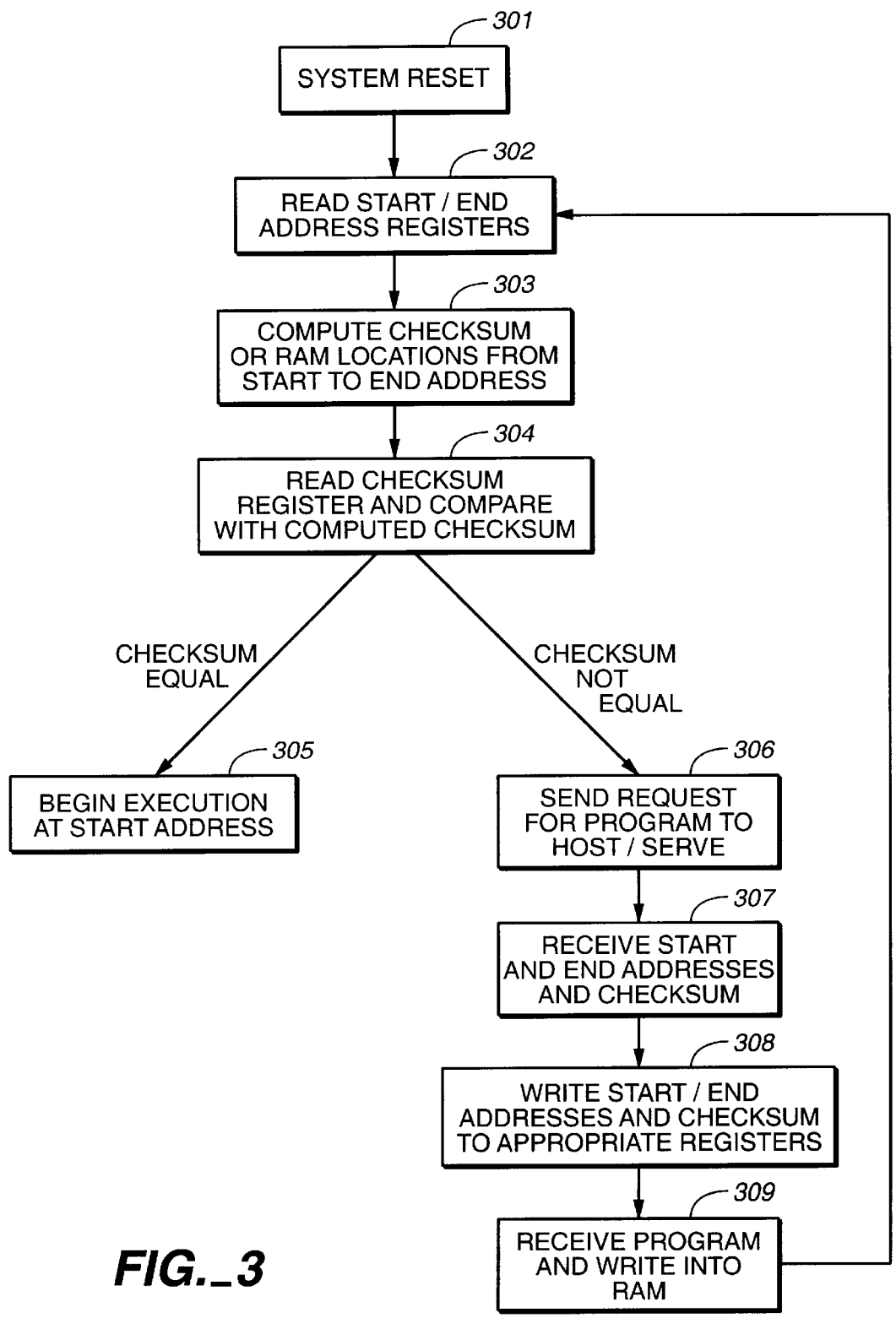
FIG._3

SINGLE CHIP SYSTEMS USING GENERAL PURPOSE PROCESSORS

BACKGROUND OF THE INVENTION

1. Field of the Invention

The present invention generally relates to the art of microelectronic integrated circuits, and more specifically to a single chip processor architecture utilizing volatile memory for program memory in addition to a communications interface.

2. Description of the Related Art

Existing microprocessor systems store programs using a combination of volatile memory, including random access memory (RAM), and non-volatile memory, including read only memory (ROM), EPROM, and flash RAM. Non-volatile memory provides integrity for stored programs and lower costs per bit of space. However, non-volatile programs are generally fixed and cannot be reprogrammed or replaced without completely swapping out the non-volatile memory components. Each non-volatile program tends to be application specific, and the need for new or updated programs increases the costs associated with manufacturing and maintaining up to date inventory.

Non-volatile memory is also frequently slower than RAM, negatively impacting system performance. Programs stored in non-volatile memory must frequently be loaded into RAM for execution.

A diagram of a typical system 10 is presented in FIG. 1. The ROM 11 contains information, such as a program or programs, which the processor 12 determines should be accessed and executed. Processor 12 issues a request to ROM 11 which loads the program into RAM 13. The program may pass through processor 12 at this stage. Once the program is loaded into RAM, the system begins executing program steps. This process tends to be very slow, and as noted the ROM 11 has particular disadvantages for implementation and use on a single chip arrangement.

Production of non-volatile memory hardware elements such as ROM may require manufacturing processes which are inefficient for constructing a microprocessor. The result is that manufacturing a microprocessor based system on a single chip tends to be difficult when non-volatile memory is required.

The need therefore exists for a simple and efficient way to provide programs to RAM without the expensive and time consuming requirements associated with non-volatile memory. Such a system should provide the capability for fabrication on a single chip.

It is therefore an object of the current invention to provide a system for minimizing the need for non-volatile memory, or potentially eliminating the need for non-volatile memory altogether.

It is another object of the current invention to provide a simple and relatively inexpensive system for providing updated information or programs to volatile memory.

It is yet another object of the current invention to provide the components of the system on a single chip which may be manufactured inexpensively and simply.

SUMMARY OF THE INVENTION

According to the current invention, there is presented a system for providing information to memory within a local device. The system initially receives information transmitted from a remote location and reads predetermined data within the local device. Predetermined data comprises start and end addresses associated with information to be received. The system computes a checksum based on information received from the remote location and the predetermined data. The system reads a predetermined checksum within the local device.

The system then compares the predetermined checksum to the received information checksum and performs an evaluation. If the predetermined checksum does not equal the received information checksum, the system requests retransmission of information and repeats the preceding steps (receiving information, computing a checksum, and comparing) until the predetermined checksum equals the received information checksum. The system then provides the valid information to local device memory.

The invention may execute a protocol to receive information packets and store the information packets in appropriate memory locations after receiving the information. The system may copy information from the remote location directly into local device memory.

As disclosed herein, the system is implemented on a single chip and provides information to memory of a local device. The system utilizes minimal non-volatile memory and comprises a microprocessor and at least one register, wherein one register holds a checksum. The registers include a start register, an end register, and a checksum register. The start register holds an address corresponding to a start point for information received by said system. The end register holds an address corresponding to an end point for information received by said system, and the checksum register holds a checksum associated with information to be received by the system.

The system also includes a communications interface. The communications interface receives information from a remote device, the microprocessor receives information from the communications interface and evaluates whether information received is valid, and the microprocessor passes valid information to RAM for execution.

The communications interface may take different forms, including but not limited to hardware for providing a distributed shared memory (DSM) architecture interface, a cache interface, or an interface, a switch, or router.

System architecture may be based on message passing or shared memory. Message passing architecture is where the microprocessor executes a protocol to receive packets and store results in appropriate memory locations. Shared memory architecture is where the microprocessor copies information from a remote server into memory.

The system may be constructed free of non-volatile memory. The system may also have a startup sequencer, and the startup sequencer may comprise a small non-volatile memory and be the only non-volatile memory in the system.

Other objects, features, and advantages of the present invention will become more apparent from a consideration of the following detailed description and from the accompanying drawings.

DESCRIPTION OF THE DRAWINGS

FIG. 1 illustrates a typical prior art system;

FIG. 2 is a single chip architecture having minimal non-volatile memory according to the current invention; and FIG. 3 presents a flowchart illustrating the operation of the current system.

DETAILED DESCRIPTION OF THE INVENTION

The present invention substantially reduces or eliminates the need for non-volatile memory by incorporating one or more communications interfaces on a single chip along with the means for rapidly verifying the integrity of a program received via the communications interface(s) when the program is in RAM.

A single chip architecture having minimal non-volatile memory according to the current invention is illustrated in FIG. 2. As shown in the drawing, a Single Chip Module (SCM) 200 includes an integrated circuit die or chip on which are formed a microprocessor 201, at least one communications interface 202, a RAM 203, and I/O 204. The SCM 200 interfaces with other hardware via link 205, and the other hardware depicted in FIG. 2 comprises a remote communications interface 206 and a host/server computer 207.

Rapid verification of the integrity of a program contained in RAM enhances overall system performance. Skipping the program loading step significantly improves performance. Thus the SCM 200 of FIG. 2 does not include a typical ROM or other non-volatile memory.

The RAM 203 may consist of Dynamic Random Access Memory (DRAM) or Static Random Access Memory (SRAM) depending on the required operation of the system. SRAM is faster and is more expensive, and thus high speed applications may require SRAM while lower speed applications may only require DRAM.

The system may utilize various methods to assure the stability of the program in RAM. The preferred method is to write-protect the program region of memory, and an alternate method is to utilize a battery backup power supply to maintain RAM in case of system power problems. These stability enhancement features provide the capability to reset or restart the system for various reasons while the program remains resident in RAM.

The details of the design and operation can vary according to the type and performance of the communications interface and the necessary degree of autonomy for the system.

With respect to the communications interface 202, the communications interface provides the means for acquiring a program from a remote source. Several types of communications interfaces may be utilized to receive program information. All communications interfaces are simplified components which are relatively simple to manufacture on a single chip as compared with non-volatile memory elements.

The first preferred embodiment of the communications interface uses a cache controller and either on-chip or off-chip SRAM to implement a second or third level cache. The second preferred embodiment comprises a memory controller having an interface to conventional DRAM, EDO DRAM, SDRAM, CDRAM, RAMBUS, or Ramlink.

The third, fourth, fifth and sixth embodiments comprise Distributed Shared Memory components, which link together several memories to provide aggregate memory and the ability of a single component of the system to utilize this aggregate memory. The third embodiment comprises using a directory controller to support DSM. The fourth embodiment is providing a protocol engine for DSM as the communications interface. The fifth embodiment is a switch or router for a DSM interconnect system, including a TIC chip or SCI. A TIC chip is a high speed packet routing system which transmits data through the system in packets, including control packets and data packets. The sixth embodiment of the communications interface employs an interface to a DSM interconnect system.

The seventh embodiment of the communications interface comprises a protocol engine for use in connection with networks, such as a TCP/IP protocol. The eighth embodiment is an interface, switch, or router for a network such as Ethernet, Token Ring, ATM, or other network system.

The ninth communications interface embodiment comprises a switch or router for an I/O interconnect system, such as SSA or Fibrechannel. The tenth embodiment is a Direct Memory Access (DMA) controller.

The eleventh embodiment is an I/O bus interface such as MCA or PCI. The twelfth embodiment is an encryption or decryption engine, such as DES. The thirteenth embodiment is radio transmitter/receiver circuitry, including signal modulation, demodulation, correlation, filtering, echo cancellation, beam forming, detection, gain control, or conversion.

The fourteenth embodiment comprises signal processing circuitry, such as filtering, automatic gain control, or fourier transforms. The fifteenth embodiment is logic for the Error Code Correction (ECC) of the cache, register file, or other memory unit. The sixteenth embodiment is logic for parity protection of the cache, register file, or other memory unit.

The seventeenth embodiment comprises a high speed serial link, such as TIC, SCI, SSA, Fibrechannel, or parallel outputs to a serial link. The eighteenth embodiment is features relating to testability, such as a SeriaLink multiplexer. The nineteenth and final communications interface embodiment is an interface to an optical link, such as an interface to infrared.

The type and quality of communications interface depends on the application and the overall system architecture. Many microprocessor based systems are part of a communication system, so the communications interface requirements are set by compatibility requirements with the rest of the system. For example, a portable device may have an infrared optical link, or a cable or radio link which is used for video data reception but can also be used to load the desired program.

As may be appreciated from the aforementioned description of the communications interface, the fabrication of the device is relatively independent of the application for the device. For example, an integrated circuit produced for use with various networking systems may require a communications interface with a TCP/IP protocol engine. The circuit may be used with a large networking system which requires constant programming updates or with a simple LAN having a server and two clients. While the TCP/IP protocol engine may require DRAM for adequate performance, multiple integrated circuits having this architecture may be constructed despite a wide variety of eventual applications and programs. Thus manufacturing of such an integrated circuit does not require extensive expenditures for fixing programs in non-volatile memory or replacement or resizing of components depending on the eventual application.

The architecture of the system as shown in FIG. 2 entails the communications interface 202 connecting via the link 205 to the remote communications interface 206. Overall system architecture may be based on message passing or shared memory, depending on performance or design goals. In a message passing architecture, the microprocessor 201 executes a protocol to receive packets and store the results in the right memory locations. In a shared memory architecture, the microprocessor can copy a program from either the host or the server into memory. Alternately, the host or server can store the program into the microprocessor's memory.

The key to the architecture as outlined in FIG. 2 is the ability to rapidly verify the integrity of the program stored in the RAM 203 of the SCM module 200. Verification is provided by the invention in the three registers: start address register 208, end address register 209, and checksum register 210. These registers hold information within the SCM 200 indicating the beginning of a program, the end of the program, and verification that the program has not been lost or modified.

When the microprocessor 201 receives a system reset, it checks the integrity of the program stored in the RAM 203. It reads the start address register 208 and the end address register 209. The microprocessor computes a checksum on the contents of the memory from the start address to the end address and compares the result with the checksum register 210. If the computed checksum matches the value stored in the checksum register 210, the program stored in the RAM 203 is correct and the microprocessor immediately begins execution of the program at the start address. This saves the time required to load the program. If the checksum does not match, the program has been lost or modified, so the microprocessor uses the communications interface 202 to load a new copy of the program into the RAM 203. When the program needs to be replaced with a new version or with a program to perform a different function, reloading could be triggered in several different ways. A control message from the host or server could instruct the microprocessor to execute the program loading process. Alternatively, a special signal could cause a system reset and clear the checksum register, resulting in a checksum mismatch that would force reloading of the program. Finally, the power could simply be removed from the device temporarily, causing the program to be lost and reloaded when the power is restored.

The process of computing the checksum of the program and comparing the checksum to the value in the checksum register requires hardwired logic or a small microcode ROM, indicated by the startup sequencer 211 of FIG. 2. The startup sequencer 211 is a generic type of hardware unit which only evaluates start address/end address and/or checksums and loading of the program. The startup sequencer 211 can therefore be manufactured on the SCM 200 with little risk of hardware obsolescence and with applications to a wide cross section of hardware devices.

An alternate embodiment of this register arrangement is to provide for storage of the start address, end address, and checksum at particular locations in RAM 203.

The user must identify the device on installation, so that the host/server 207 transmits and loads the appropriate program to the SCM 200. Initial identification applies when the device is identifiable by its position within the communications interconnect topology.

Alternately, the device may have a vendor and serial number indication in a non-volatile register within the SCM 200 which is set when manufacturing the device. This procedure is appropriate when the communications medium does not facilitate uniquely locating the system. The procedure would apply to radio or other wireless systems.

In either case, the host/server can obtain device requirements from a database and receive the appropriate program from either a network such as the Internet or from a local copy.

Operation of the system is illustrated in FIG. 3. The system initially performs a reset in step 301. The system then reads the start and end address registers in step 302. The system then evaluates the information or program in RAM by computing the checksum on RAM locations from the start to end address of the program received in step 303. Step 304 reads the checksum register 210 and compares the checksum in the register to the computed checksum. If the two checksum values are equal, step 305 indicates that the microprocessor must commence executing the program at the start address.

If the two checksums are not equal, the system transmits a request back to the remote host/server 207 for the remote host/server 207 to retransmit the program in step 306. The SCM 200 then receives the start and end addresses and the associated checksum in step 307. Step 307 provides a means for verifying that the program is received correctly. On receipt of the start and end addresses and checksum, these values are written into registers in step 308. The program is then received and written into RAM in step 309. The system then has received the program and returns to step 302 to verify its integrity and begin execution.

According to this sequence, after system reset the system determines whether the control program is in RAM 203 or needs to be loaded. The microprocessor 201 executes instructions from a microcode ROM or hardwired logic to compute a checksum on the memory contents specified by the start address and end address registers 208 and 209 or the comparable locations in RAM 204. If the checksum matches the value in the checksum register, the microprocessor begins executing the program at the start address. Otherwise, the microprocessor 201 begins the program loading process.

The program loading process depends on overall system architecture. In a message passing architecture, the microprocessor 201 first sends a boot request message. The host or server responds with a series of message packets containing the program. The microprocessor 201 executes a communications protocol to receive the message packets and load the program into memory. In a shared memory architecture, the microprocessor 201 executes a simple memory control loop to load the program into memory. Alternately, a single read request from the microprocessor 201 could trigger loading of the program into memory by the remote host/server 207.

After the program is loaded, the start address, end address, and checksum for the program are stored in their respective registers 208, 209, and 210. The microprocessor 201 then executes the procedures normally followed after a reset. The microprocessor 201 computes the checksum, compares it with the value stored in the checksum register 210, and if the value in the checksum register 210 matches the computed checksum, the program branches to the start address of the program and begins execution.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A microprocessor system, comprising:
   a volatile memory for storing a first executable program;
   a register for holding a pre-determined checksum based on the contents of said first executable program;
   a communications interface; and
   a microprocessor for calculating a calculated checksum based on the contents of said first executable program stored in said volatile memory in response to a system reset, for comparing said calculated checksum with said pre-determined checksum, and for receiving a second executable program through said communications interface if said calculated checksum is not equal to said predetermined checksum.

2. The microprocessor system of claim 1, wherein the system is implemented on a single chip.

3. The microprocessor system of claim 2, wherein the system is free of non-volatile memory.

4. The microprocessor system of claim 1, wherein said microprocessor includes a startup sequencer for computing said calculated checksum.

5. The microprocessor system of claim 1, wherein said register comprises a start register tor storing a starting address of said first executable program, an end register for storing an ending address of said first executable program, and a checksum register for storing said pre-determined checksum.

6. The microprocessor system of claim 1, wherein said communications interface receives said second executable program from a remote device.

7. The microprocessor system of claim 1, wherein said communications interface comprises hardware for providing a distributed shared memory (DSM) architecture interface.

8. The microprocessor system of claim 1, wherein said communications interface comprises a cache interface.

9. The microprocessor system of claim 1, wherein said communications interface comprises one of the group of an interface, a switch, and a router.

10. The microprocessor system of claim 1, wherein an architecture of the system is a message passing architecture.

11. The microprocessor system of claim 10, wherein the microprocessor executes a protocol to receive packets and stores results in a memory location.

12. The microprocessor system of claim 1, wherein an architecture of the system is a shared memory architecture.

13. The microprocessor system of claim 12, wherein the microprocessor copies said second executable program from a remote server into a memory location.

14. The microprocessor system of claim 12, wherein a remote server copies said second executable program into a memory location.

15. A single-chip microprocessor system, comprising:
a random access memory for storing a first executable program;
a memory location for holding a pre-determined checksum based on the contents of said first executable program;
a communications interface; and
a microprocessor for calculating a calculated checksum based on the contents of said first executable program stored in said random access memory in response to a system reset, for comparing said calculated checksum with said predetermined checksum, and for receiving a second executable program through said communications interface if said calculated checksum is not equal to said predetermined checksum.

16. The microprocessor system of claim 15, wherein the system is implemented on a single chip.

17. The microprocessor system of claim 16, wherein the system is free of non-volatile memory.

18. The microprocessor system of claim 15, wherein said microprocessor includes a startup sequencer for computing said calculated checksum.

19. The microprocessor system of claim 15, wherein said register comprises a start register for storing a starting address of said first executable program, an end register for storing an ending address of said first executable program, and a checksum register for storing said predetermined checksum.

20. The microprocessor system of claim 15, wherein said communications interface receives said second executable program from a remote device.

21. The microprocessor system of claim 15, wherein said communications interface comprises hardware for providing a distributed shared memory (DSM) architecture interface.

22. The microprocessor system of claim 15, wherein said communications interface comprises a cache interface.

23. The microprocessor system of claim 15, wherein said communications interface comprises one of the group of an interface, a switch, and a router.

24. The microprocessor system of claim 15, wherein an architecture of the system is a message passing architecture.

25. The microprocessor system of claim 24, wherein the microprocessor executes a protocol to receive packets and stores results in a memory location.

26. The microprocessor system of claim 15, wherein an architecture of the system is a shared memory architecture.

27. The microprocessor system of claim 26, wherein the microprocessor copies said second executable program from a remote server into a memory location.

28. The microprocessor system of claim 26, wherein a remote server copies said second executable program into a memory location.

* * * * *